Feb. 20, 1968  J. W. GARRISON  3,369,270

SPRING-RETAINED TUBE-MOUNTED CASTER

Filed Dec. 27, 1965

*INVENTOR.*
JERRY WILLIAM GARRISON
BY
*Lockwood, Woodard, Smith & Winkart*
*Attorneys*

_United States Patent Office_

3,369,270
Patented Feb. 20, 1968

3,369,270
SPRING-RETAINED TUBE-MOUNTED CASTER
Jerry W. Garrison, Evansville, Ind., assignor to Bliss & Laughlin Industries Incorporated, Oak Brook, Ill., a corporation of Delaware
Filed Dec. 27, 1965, Ser. No. 516,453
1 Claim. (Cl. 16—18)

ABSTRACT OF THE DISCLOSURE

A caster having a stem with a legmount affixed to the stem and arranged for mounting on a tubular chair or table leg, the caster horn being swiveled to the stem. A retainer spring affixed to the stem and including a plurality of downwardly and outwardly inclined pointed projections facilitating insertion into the tubular leg but resisting removal therefrom.

*Background and description*

This invention relates generally to casters and more particularly to furniture casters employed in furniture having legs of tubular construction.

It is a general object of the present invention to provide a caster construction well adapted to employment in furniture having tubular legs.

A further object is to provide an inexpensive but durable and reliable construction.

In a typical embodiment of the present invention, a caster assembly including a horn swiveled to a stem is provided with a leg mount on the stem. The leg mount is provided with an axially extending flange, forming a cup adapted to receive the tubular leg of furniture, and align the leg so that its axis is collinear with that of the caster stem.

A multi-pointed retainer spring is mounted at the upper end of the stem and the points thereof are directed generally downward and the dimension across points in the free state of the spring is greater than that of the interior of the tube so that although the caster horn with stem can be readily installed in the tube, it very strongly resists removal, due to the points biting into the interior wall of the tube. A suitable spring base is provided to provide adequate support for the spring and prevent its collapse during installation.

The full nature of the invention will be understood from the accompanying drawings and the following description and claim:

Figure 1:
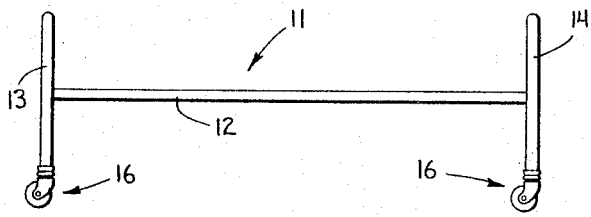
FIGURE 1 is a side elevational view of a bed having tubular leg construction with casters incorporated therein according to the present invention.
Figure 2:
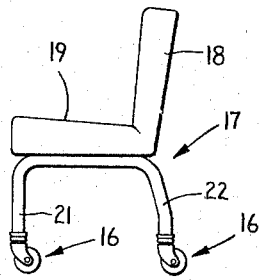
FIGURE 2 is a side elevational view of a chair having tubular leg construction with casters incorporated therein according to a typical embodiment of the present invention.

Referring now to the drawings in detail, FIGURE 1 shows a bed 11 having the typical horizontal frame member 12 and ends 13 and 14, each end having a pair of tubular legs, with caster assemblies 16 mounted therein. FIGURE 2 is a side elevational view of a chair 17 having a back 18, seat 19 and showing front leg 21 and rear leg 22, both of which are formed of a single piece of tubing and have casters 16 mounted therein according to a typical embodiment of the present invention.

Figure 3:
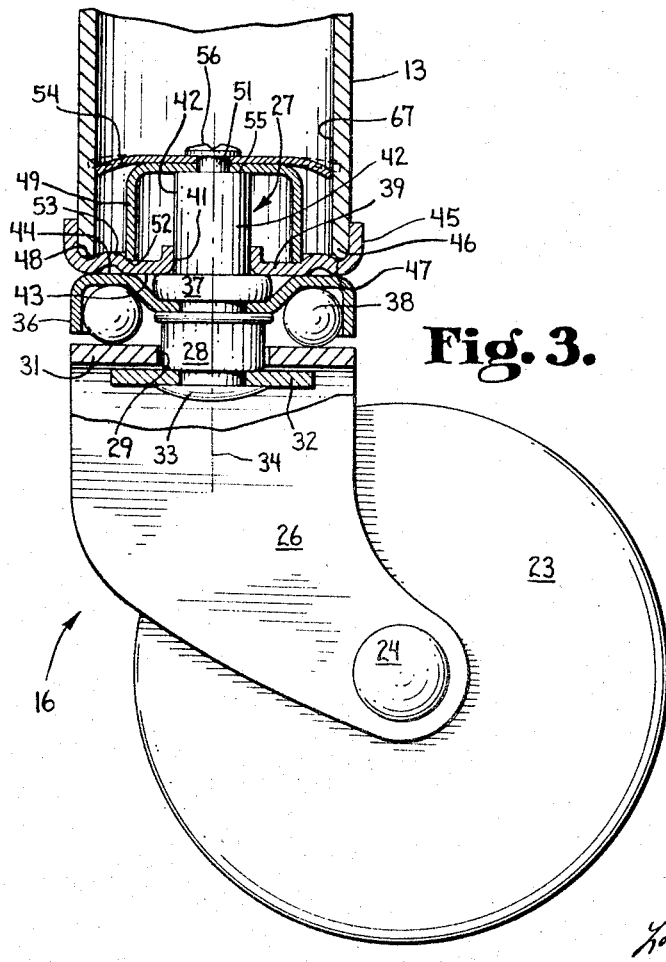
FIGURE 3 is an enlarged fragmentary section through a leg such as shown in FIGURES 1 and 2, and illustrating details of the caster installation according to a typical embodiment of the present invention.
Figure 4:
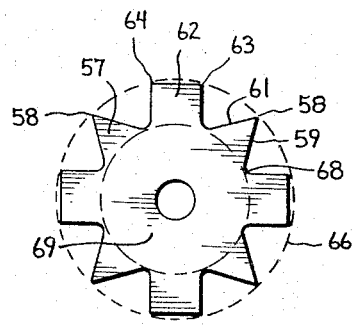
FIGURE 4 is an enlarged top plan view of the retainer spring employed in the typical embodiment, the spring being somewhat enlarged to better show construction details.

Referring now to FIGURE 3, the caster 16 includes a caster wheel 23, axle 24 and horn 26 mounted through the axle to the wheel. The caster stem 27 is provided with a lower portion 28 thereof passing through the aperture 29 in the bridge 31 of the horn, with a washer 32 received in the groove and retained by the head 33. So the horn is free to swivel on the stem, the swivel axis 34 being ahead of the axle 24 to provide caster action.

A bearing retainer 36 is affixed to the stem under the flange 37 and retains the ball bearings 38 on which the retainer is supported by the caster horn bridge 31.

According to the present invention, the legmount 39 has the central aperture 41 thereof formed by an axially extending flange and this is fittingly received on the upper portion 42 of the stem. The lower face 43 is received on the upper face of the stem flange 37 and may additionally be supported by the upper face 44 of the bearing retainer 36. The legmount has an axially extending flange 45 coaxial with the aperture 41 thereof and therefore coaxial with the stem axis 34. The inner wall of the flange is thereby well adapted to receive the lower end portion 46 of the tubular bed posts 13 or 14 or the chair legs 21 and 22. For example, the reference numeral 13 is applied to represent one of these bed posts. The lower marginal edge 47 of the bed post rests on the annular groove 48 formed in the legmount and this feature, together with the fitting reception of the outer circular surface of the post with the inner circular wall of the axial flange 45, serves to align the post so that it too is coaxial with the stem.

Further according to the present invention, an inverted cup 49, provided with a central aperture received on the stem portion 51, is centrally supported on the annular upper ledge of stem portion 42 around portion 51. Peripheral support is provided through the lower circular marginal edge 52 of the cup supported on an upper face of the legmount just inside the annular ridge 53. Accordingly, both the upper and lower ends of this cup are aligned with the axis of the stem, and this cup serves as a base for the retainer spring 54 employed according to the present invention. This spring is typically made of spring steel and, as shown in FIGURE 3, is affixed between the staked down top end 56 of the stem and the annular seating surface 55 provided up at the upper end of the stem portion 42. Thus, the spring and spring base are affixed to the upper end of the stem.

The upper face of the spring base is flat and provides central support for the retainer spring, but the spring is provided with a plurality of projections 57 having sharp points 58 formed by the intersection of marginal edges 59 and 61, for example, at an acute angle. The spring also has a plurality of projections 62, each of which has two points 63 and 64, each of which is formed by the intersection of two marginal edges at right angles. The points are disposed in a circle 66, the diameter of which is greater than the inside diameter of the interior wall 67 of the post. It has been found that excellent results are obtained where the unstressed spring point circle diameter is selected to be about 1/32-inch greater than the inside diameter of the tube. Also the projections, which may be said to extend outwardly from something of a base circle 68 of approximately the same diameter as the upper face of the spring base, curve downwardly from the plane of the central portion 69 of the spring so the points are disposed on inclined planes pointing outwardly and downwardly. The result is that while it is easy to push the caster up into the post, and deflect the projections and spring points down to the position shown by the solid outlines in FIGURE 3, from the free position shown by the dotted outlines in FIGURE 3, it is practically impossible to reverse the procedure and pull the caster assembly out of the tube. The spring material, being harder than the material of the post, and being a spring material, initiates a biting action of the points into the interior wall as a result of the restoring forces developed in the spring during deflection upon installation of the caster in the tube. These restoring forces are supplemented by any force tending to pull the caster out of the tube to further effect biting action of the points into the tube interior surface. An example of the material used for the spring steel, is SAE 1050 spring steel, annealed and hardened to 45–52 Rockwell C. The post material may be anything from mild steel to aluminum or magnesium, for example.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:
1. The combination comprising:
   a caster wheel;
   a horn mounted to said wheel and supported thereby;
   a stem supported by said horn;
   a legmount mounted on said stem;
   a bearing retainer affixed to said stem;
   bearings disposed between said retainer and said horn and supported by said horn and supporting said retainer and thereby supporting said stem, said bearings being confined to enable rotation of said horn with respect to the axis of said stem, the rotation of said wheel being on an axis horizontally offset from said stem axis for caster action,
   a spring base received around said stem and supported centrally by said stem and peripherally by said legmount, said base having a flat circular top surface of substantially greater area than the top of said stem and less area than the top of said legmount;
   and a retainer spring affixed to said stem and having a plurality of pointed projections thereon, said projections being generally downwardly and outwardly inclined and the points thereof directed outwardly on downward inclines to facilitate downward deflection of said projections by a tube moved downward around said spring and onto said legmount, but said points resisting upward movement of the tube by biting into the interior thereof,
   the bases of said projections being supported by said spring base.

References Cited

UNITED STATES PATENTS

| | | | |
|---|---|---|---|
| 2,049,344 | 7/1936 | Wittke | 16—18 |
| 2,654,620 | 10/1953 | Tinnerman | 16—42 |
| 2,923,017 | 2/1960 | Turbyfill | 16—18 |
| 3,006,673 | 10/1961 | Swick | 16—42 |
| 1,875,113 | 8/1932 | Noelting et al. | 16—21 |

FOREIGN PATENTS 750,942    6/1956    Great Britain.

BOBBY R. GAY, *Primary Examiner.*

DORIS L. TROUTMAN, *Assistant Examiner.*